2,870,169
ETHERS OF THE FURAN SERIES

Joachim Dazzi, Dayton, Ohio, assignor to Monsanto Chemical Company, St. Louis, Mo., a corporation of Delaware No Drawing. Application November 30, 1955
Serial No. 550,238

4 Claims. (Cl. 260—347.8)

This invention relates to ethers, and more particularly provides new and valuable ethers of chlorophenols and alcohols of the furan series, methods of preparing the same, and dielectric compositions comprising the same.

According to the invention there are provided ethers of the formula

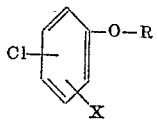

in which R is selected from the class consisting of the furfuryl and the tetrahydrofurfuryl radicals and X is selected from the class consisting of chlorine and the radical —O—R.

I have found that compounds having the above formula are readily prepared by heating trichlorobenzene with furfuryl or tetrahydrofurfuryl alcohol in the presence of an alkali metal hydroxide, i. e., sodium, potassium or lithium hydroxide.

One class of compounds of the above formula includes the 2-(dichlorophenoxymethyl)furans or the 2-(dichlorophenoxymethyl)tetrahydrofurans, e. g., 2-(2,3-dichlorophenoxymethyl)furan, 2 - (2,6 - dichlorophenoxymethyl)-furan, 2 - (3,4 - dichlorophenoxymethyl)tetrahydrofuran, 2-(2,5-dichlorophenoxymethyl)tetrahydrofuran, etc.

Another class of compounds having the above formula and prepared according to the invention by the condensation of a trichlorobenzene with furfuryl or tetrahydrofurfuryl alcohol includes the bis(furfuryloxy)chlorobenzenes and the bis(tetrahydrofurfuryloxy)chlorobenzenes, e. g., 2,3-bis(tetrahydrofurfuryloxy)chlorobenzene, 2,5-bis(furfuryloxy)chlorobenzene, 3,4 - bis(tetrahydrofurfuryloxy)-chlorobenzene, 2,5 - bis(tetrahydrofurfuryloxy)chlorobenzene, 2-4-bis(furfuryloxy)chlorobenzene, 2, 3-bis(furfuryloxy)chlorobenzene, etc.

Formation of the present ethers occurs by replacement of one or two of the chlorine atoms of the trichlorobenzene by one or two furfuryloxy radicals. The replacement reaction takes place readily by heating the trichlorobenzene with furfuryl or tetrahydrofurfuryl alcohol in the presence of an alkali metal hydroxide. Since the reaction may result in the replacement of more than one chlorine atom, when desiring a preponderance of the substitution of only one chlorine atom by the furfuryloxy or tetrahydrofurfuryloxy radical, it is generally advisable to use a large excess of the trichlorobenzene. On the other hand, when the major product to be obtained is the diether, an excess of the furfuryl or tetrahydrofurfuryl alcohol is advantageously used. The quantity of alkali metal hydroxide employed is also somewhat controlling in the type of product obtained. Hydrogen chloride is liberated in the replacement of the nuclear chlorine by the furfuryloxy or tetrahydrofurfuryloxy moiety of the alcohol and in order to obtain good yields of either the mono-ether or the di-ether, there should be present in the reaction mixture enough of the alkali to neutralize the liberated acid. Usually from one to two moles of the alkali metal hydroxide per mole of the furfuryl or tetrahydrofurfuryl alcohol is used. An excess of sodium hydroxide is not detrimental to the reaction, whereas a molar quantity which is substantially less than that of the alcohol is conducive to lower yields of ether product.

The reaction time and temperature appears to have little, if any, effect on the nature of the ether product. Although a primarily formed mono-ether will react with another mole of furfuryl or tetrahydrofurfuryl alcohol to yield a di-ether, higher temperatures or continued heating do not suffice in effecting substantial conversion to the di-ether. An excess of one of said alcohols over that required for replacement of one chlorine atom should be present in order to obtain any substantial formation of the die-ether. Whether the reactant quantities present are those which favor mono-substitution (excess of trichlorobenzene) or whether the properties are such as to favor di-substitution (excess of one of said alcohols), ether formation occurs after heating at a temperature of from 100° C. to 250° C., and preferably of from 125° C. to 200° C. for a time of, say, several hours to a day. The progress of the reaction can be generally followed by noting the alkalinity or the quantity of water being formed. While provision for removal of water during the reaction is not required, better yields of ether product and a ready means of determining reaction rate are afforded by operating in a reaction vessel which is equipped with some water-removing facility, e. g., a water trap or take-off head.

Although, as above stated, reaction of the trichlorobenzene and the furfuryl or tetrahydrofurfuryl alcohol can be so directed as to result in a preponderance of either mono- or di-ether formation, generally the product contains a mixture of the two in varying proportions. These can be readily separated from each other and from any unreacted initial material and/or from any diluent by fractional distillation. While the present condensation reaction takes place in the absence of any extraneous solvent or diluent, reaction may be facilitated by operating in the presence of an inert liquid as solvent or diluent, e. g., toluene, xylene, etc.

The present ethers are stable, rather high-boiling compounds which are useful for a variety of industrial and agricultural purposes, e. g., as solvents for polymeric materials and as biological toxicants. They are particularly valuable as liquid dielectrics, and are very advantageously employed as liquid impregnants in capacitor and cable manufacture, as transformer coolants, and in the fabrication of switch gear.

Characteristics of the present chloro-ethers are such as to render them particularly valuable as impregnants for cellulosic insulating materials. It is known in the art that impregnation of cellulosic materials, e. g., wood pulp paper, cotton, cotton fabric, cellulose acetate fibers and textiles, by certain liquid dielectrics provides an insulating material having a dielectric constant which is much higher than that of either the cellulosic material before impregnation or of the liquid dielectric. Some of the first liquids used for this purpose were mineral oils, the dielectric strength of oil impregnated paper having been reported by Bailey (Radio Engineering, 17, 17, 35 (1937)) to be 15 times as high as that of the oil alone. However, because mineral oils are readily oxidized, their usefulness as insulating media and as impregnating agents for cellulosic materials has been limited in that exposure to air, sunlight or moisture often leads to gas formation, gaseous ionization and formation of wax. These changes affect power factor stability.

Although wood pulp paper, alone, has good insulating properties, it is also affected by exposure to air, particularly at higher temperatures. While the rate of mechanical deterioration is reduced by impregnating the insulation with oil, this was of little advantage as noted above. Accordingly, the art resorted to other impregnating agents, particularly the highly chlorinated aromatic hydrocarbons. These materials have dielectric strengths which are higher than those of the mineral oils. In addition, they are non-flammable and more stable to the influence of air, moisture and light. However, their general utility has been somewhat hampered in that under high operating temperatures and voltages decomposition of said highly chlorinated hydrocarbons is manifested. Hydrogen chloride is evolved; and this attacks not only the paper which had been impregnated but also the metal portions of the capacitor.

The presently provided ethers are high-boiling materials which possess high resistivities and low power factors. Their stability to high temperatures is evidenced by little or no change in power factor readings after heating for 24 hours at 100° C. Their stability is further illustrated by continued high resistivities, which indicates freedom from conducting ions which would be present if decomposition of the ethers had occurred. The present ethers remain liquid at low temperatures, whereby there is avoided a decrease in dielectric constant due to freezing of the dipoles.

The above characteristics thus speak for eminent suitability of these ethers as impregnating agents for cellulosic materials, and an embodiment of the present invention is the provision of improved cellulosic insulating agents comprising porous materials derived from cellulose, e. g., pulps, fibers, textiles or papers derived from wood, cotton or linen, which porous products have been impregnated with said ethers. A noteworthy feature of the present invention is the provision of a capacitor comprising a pair of electrodes and an insulating agent associated with each of the electrodes and isolating them from each other, said insulating agent comprising a cellulosic material impregnated with the present ethers.

In order to more particularly describe this feature of the invention, details of the construction of a paper capacitor are set forth here by way of illustration:

Three sheets of tissue paper (preferably Kraft capacitor tissue) are stacked upon each other, and a thin aluminum foil (about 0.0003″ in thickness) is laid on the top sheet of tissue. The foil is then covered with three more sheets of the tissue and another sheet of the foil is placed thereon so that the two sheets of metal foil are separated from each other by the tissues. On the second metal sheet there are stacked three more sheets of said tissue and the stack of alternating layers of metal foil and tissues thus obtained is wound into a cylindrical roll. This is placed in a container, and at this point electrical connecting means, e. g., wire or bar conductors, depending upon the size of the assembly, may be connected to the metal foils in known manner. After drying, preferably in a heated vacuum oven, one or more of the present ethers is added to the container in a quantity sufficient to impregnate thoroughly the paper content thereof. The container is then sealed.

Alternatively, and particularly in the manufacture of small resistors which for the sake of economy are housed in paper tubes rather than in leak-proof containers, the tissue paper is impregnated with the present ethers previous to interleaving with the metal foil in the manner described above.

The invention is further illustrated but not limited by the following examples:

*Example 1*

Tetrahydrofurfuryl alcohol was reacted with trichlorobenzene as follows:

To a 2-liter, 3-neck flask equipped with stirrer, column and Dean-Stark trap there was charged 2.5 moles (454 g.) of 1,2,4-trichlorobenzene, 3.75 moles (383 g.) of redistilled tetrahydrofurfuryl alcohol, B. P. 75° C.–80° C./20–25 mm., 3 moles (120 g.) of sodium hydroxide and 250 g. of toluene. The mixture was heated to 152° C. within about 2.0 hours and at from 152° C. to 180° C. for 5 hours. During the heating period 56 cc. of water and 140 g. of toluene was collected. After allowing the resulting reaction mixture to cool, it was neutralized to phenolphthalein by treatment with 18 ml. of concentrated hydrochloric acid (equal to 0.22 mole of HCl) and diluted with 500 ml. of water, whereupon most of the precipitated sodium chloride went into solution. The whole was then diluted with about 700 ml. of ether, and filtered. After allowing the filtrate to stratify, the organic layer which formed was separated and the aqueous layer was washed with ether. The ether extract thus obtained was combined with the first organic layer, and the combined product was washed with about 100 ml. of water and 150 ml. of brine. Distillation of the washed, orange liquid thus obtained gave (I) 549.4 g. of the substantially pure 2-(dichlorophenoxymethyl)-tetrahydrofuran, B. P. 130°–150° C./0.4–1.0 mm. and (II) 41.1 g. of the diether, bis(tetrahydrofurfuryloxy)-chlorobenzene, B. P. 192–204° C./0.8–1.0 mm. A narrow cut of (I) B. P. 134–140° C./0.6–0.8 mm., analyzed as follows:

|  | Found | Calcd. for $C_{11}H_{12}Cl_2O_2$ |
|---|---|---|
| Percent C | 53.34 | 53.40 |
| Percent H | 4.92 | 4.85 |
| Percent Cl | 28.77 | 28.77 |

The diether fraction, i. e., (II) analyzed as follows:

|  | Found | Calcd. for $C_{16}H_{21}ClO_4$ |
|---|---|---|
| Percent C | 61.86 | 61.5 |
| Percent H | 6.61 | 6.73 |
| Percent Cl | 11.4 | 11.4 |

Based on the charged 1,2,4-trichlorobenzene there was obtained 89.4 percent conversion to mono-ether and 5.0 percent to di-ether. The 2-(dichlorophenoxymethyl)-tetrahydrofuran thus obtained was found to have a volume resistivity of $55 \times 10^9$ ohm-cm. at 25° C., a pour point of minus 35° C., and the following dielectric constant and power factor values at the frequencies and temperature noted below:

| Test Frequency | Dielectric Constant | | Power Factor | |
|---|---|---|---|---|
|  | 25° C. | 100° C. | 25° C. | 100° C. |
|  | *Percent* | *Percent* | *Percent* | *Percent* |
| 10 kc | 8.0 | 6.3 | 0.2 | 1.7 |
| 100 kc | 8.0 | 6.4 | 0.0 | 0.0 |

The low power factor values at both test frequencies and at both test temperatures show very good stability of the 2-(dichlorophenoxymethyl)tetrahydrofuran. Power capacitors in which the present ether is employed for impregnating the paper are particular useful in that they may be used without freezing of the dipoles at temperatures which approximate the low pour point of this ether.

Testing of (II), i. e., the bis(tetrahydrofurfuryloxy)-chlorobenzene, also gave good results, the dielectric constant and power factor values of (II) being found to be 10.5 and 1.1% respectively at 100 kc. and 25° C. Because (II) has a solidifying point which is approximately that of (I), a mixture of (I) and (II) may be employed as the impregnating agent in the preparation of paper capacitors as transformer coolants.

*Example 2*

This example describes the reaction of 1,2,4-trichlorobenzene with tetrahydrofurfuryl alcohol using greater quantities of reactant than those employed in Example 1. A mixture consisting of 6.75 moles (1,220 g.) of the trichlorobenzene, 10.15 moles (1,035 g.) of said alcohol, 8 moles (320 g.) of sodium hydroxide and 200 ml. of toluene was heated at a temperature of 140–172° C. for about 7 hours while collecting 154 ml. of water of reaction as it was formed. The reaction mixture was then diluted with 1 liter of water and neutralized with 0.38 mole of hydrogen chloride. The organic layer which separated was washed with water and brine and made alkaline to phenolphthalein in order to remove any phenol which might still be present. After subsequent neutralizing, filtering, and heating of the filtrate at 150° C./18 mm. in order to remove water and other low boiling materials, the residue was fractionated to get 1125 g. of (I) the substantially pure 2-(dichlorophenoxymethyl)tetrahydrofuran, B. P. 135–142° C./0.6–0.7 mm. analyzing 53.38% C, 4.96% H, and 28.07% Cl, and 88 g. of (II) bis(tetrahydrofurfuryloxy)chlorobenzene, B. P. 180–200° C./0.8 mm. analyzing 61.00% C, 6.73% H, and 11.44% Cl. Based on the charged 1,2,4-trichlorobenzene, there was obtained 89.5 percent conversion to the mono-ether and 3.7 percent to the di-ether.

*Example 3*

A mixture consisting of 9 moles (882 g.) of furfuryl alcohol, 6 moles (1086 g.) of 1,2,4-trichlorobenzene, 9.3 moles (521 g.) of potassium hydroxide and 150 ml. of toluene was charged to a 5-liter, 4-neck flask equipped with a stirrer, thermometer and column bearing a head for removal of condensed vapors. The mixture was heated, with stirring, for about 11.5 hours at a pot temperature of from 130° C. to 159° C. During the first 5.5 hours of heating there was collected 191 cc. of water. When heating was discontinued, about 2 liters of water were added to the reaction mixture, and the whole was filtered. After allowing the filtrate to stratify, the organic layer which formed was separated and washed with water. Water was removed from the washed material by heating to 60° C. at a pressure of 30–35 mm. of mercury. Subsequent distillation of the heated material gave 179 g. of the substantially pure 2-(dichlorophenoxymethyl)furan, B. P. 80° C.–115° C./0.1–0.3 mm., and analyzing as follows:

|  | Found | Calcd. for $C_{11}H_8Cl_2O$ |
|---|---|---|
| Percent C | 55.94 | 54.70 |
| Percent H | 4.19 | 3.29 |

The 2-(dichlorophenoxymethyl)furan is also advantageously employed as impregnating agent in the manufacture of paper capacitors.

Although the present ethers are particularly valuable as impregnating agents for cellulosic materials adapted for use as dielectrics, because of their very good electrical properties, their thermal stability and their ability to remain liquid at low temperatures they are of general utility as liquid dielectrics. They are likewise very useful as functional fluids, e. g., as heat-transfer media and as hydraulic fluids.

Another significant property of the present ethers comprises their solvent characteristics. The mono-ether of Examples 1 and 2, for example, is a powerful solvent for polyvinyl chloride, polystyrene, the polyethylene sulfides and various nitrogen-containing polymeric materials. Since the present ethers are very stable materials, they are particularly useful in processes which involve extrusion of a polymer solution into a non-solvent, e. g., in the manufacture of synthetic fibers.

What I claim is:

1. An ether selected from the class consisting of 2-(dichlorophenoxymethyl)furan, 2 - (dichlorophenoxymethyl)tetrahydrofuran, and bis(tetrahydrofurfuryloxy)-chlorobenzene.
2. 2-(dichlorophenoxymethyl)furan.
3. 2-(dichlorophenoxymethyl)tetrahydrofuran.
4. Bis(tetrahydrofurfuryloxy)chlorobenzene.

References Cited in the file of this patent
UNITED STATES PATENTS

| 2,041,594 | Clark | May 19, 1936 |
| 2,072,797 | Clark | Mar. 2, 1937 |
| 2,165,813 | Prutton | July 11, 1939 |
| 2,170,782 | Clark | Aug. 22, 1939 |
| 2,277,359 | Schirm | Mar. 24, 1942 |
| 2,418,820 | Coggins | Apr. 15, 1947 |
| 2,456,381 | Clark | Dec. 14, 1948 |
| 2,475,801 | Novotny | July 12, 1949 |
| 2,535,690 | Miller | Dec. 26, 1950 |
| 2,666,065 | Swadesh | Jan. 12, 1954 |
| 2,711,498 | Robinson | June 21, 1955 |

OTHER REFERENCES

Beilstein, vol. 6, page 432 (1923).